United States Patent
Xu et al.

(10) Patent No.: US 12,096,289 B2
(45) Date of Patent: Sep. 17, 2024

(54) CELL SELECTION AND RESELECTION CRITERIA FOR NON-TERRESTRIAL NETWORK (NTN) NETWORKS

(71) Applicant: Apple Inc., Cupertino, CA (US)

(72) Inventors: Fangli Xu, Beijing (CN); Sarma V. Vangala, Campbell, CA (US); Ajay Panchal, San Diego, CA (US); Haijing Hu, Los Gatos, CA (US); Krisztian Kiss, Hayward, CA (US); Murtaza A. Shikari, Mountain View, CA (US); Naveen Kumar R. Palle Venkata, San Diego, CA (US); Ralf Rossbach, Munich (DE); Sree Ram V. Kodali, San Jose, CA (US); Srinivasan Nimmala, San Jose, CA (US); Vijay Venkataraman, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,844

(22) PCT Filed: Oct. 22, 2020

(86) PCT No.: PCT/CN2020/122900
§ 371 (c)(1),
(2) Date: Sep. 20, 2021

(87) PCT Pub. No.: WO2022/082632
PCT Pub. Date: Apr. 28, 2022

(65) Prior Publication Data
US 2023/0269635 A1    Aug. 24, 2023

(51) Int. Cl.
H04W 4/00    (2018.01)
H04W 36/00   (2009.01)
(Continued)

(52) U.S. Cl.
CPC ..... H04W 36/00835 (2018.08); H04W 36/08 (2013.01); H04W 36/30 (2013.01); *H04W 84/06* (2013.01)

(58) Field of Classification Search
USPC ......................................... 370/329, 330, 328
See application file for complete search history.

(56) References Cited

U.S. PATENT DOCUMENTS

2011/0263254 A1    10/2011  Nader
2015/0056997 A1    2/2015   Su et al.
(Continued)

FOREIGN PATENT DOCUMENTS

CN    109690973 A    4/2019
CN    111132254 A    5/2020
(Continued)

OTHER PUBLICATIONS

3rd Generation Partnership Project; Technical Specification Group Radio Access Network; NR; Radio Resource Control (RRC) protocol specification (Release 16); 3GPP TS 38.331 V16.2.0 (Sep. 2020); http://www.3gpp.org.
(Continued)

*Primary Examiner* — Chuong T Ho
(74) *Attorney, Agent, or Firm* — Eschweiler & Potashnik, LLC

(57) ABSTRACT

Techniques discussed herein facilitate cell selection and/or reselection in scenarios involving one or more Non-Terrestrial Network (NTN) cells. One example embodiment is a User Equipment (UE) device comprising a processor configured to perform operations comprising: determining one or more suitable cells for one of a cell selection procedure or a cell re-selection procedure, wherein the one or more suitable cells comprise a first cell associated with a satellite of a NTN; determining a ranking for each cell of the one or (Continued)

more suitable cells, wherein the ranking for the first cell is based at least in part on a location of the UE, ephemeris data of the satellite, and one or more additional parameters; selecting a highest ranked cell of the one or more suitable cells based on the determined rankings for each cell of the one or more suitable cells; and camping on the highest ranked cell.

20 Claims, 10 Drawing Sheets

(51) Int. Cl.
*H04W 36/08* (2009.01)
*H04W 36/30* (2009.01)
*H04W 84/06* (2009.01)

(56) References Cited

U.S. PATENT DOCUMENTS

| | | | | |
|---|---|---|---|---|
| 2020/0178135 | A1* | 6/2020 | Yun | H04B 7/18541 |
| 2020/0305039 | A1 | 9/2020 | Jung | |
| 2022/0150818 | A1* | 5/2022 | Liberg | H04B 7/18539 |
| 2022/0182904 | A1* | 6/2022 | Li | H04W 48/16 |
| 2022/0322182 | A1* | 10/2022 | Lee | H04B 7/0617 |
| 2022/0408328 | A1* | 12/2022 | Adjakple | H04W 36/0061 |
| 2023/0008354 | A1* | 1/2023 | Xu | H04W 48/20 |
| 2023/0035046 | A1* | 2/2023 | You | H04W 76/19 |
| 2023/0102334 | A1* | 3/2023 | Roy | H04W 36/06 370/316 |
| 2023/0319661 | A1* | 10/2023 | Määttänen | H04W 36/00838 370/331 |
| 2023/0397060 | A1* | 12/2023 | Rune | H04W 36/0077 |

FOREIGN PATENT DOCUMENTS

| | | |
|---|---|---|
| CN | 111294801 A | 6/2020 |
| CN | 111565427 A | 8/2020 |
| CN | 111726844 A | 9/2020 |
| WO | 2020092566 A1 | 5/2020 |

OTHER PUBLICATIONS

International Preliminary Report on Patentability Dated Apr. 13, 2023 for International Application PCT/CN2020/122900.
International Search Report Dated Jul. 9, 2021 for International Application PCT/CN2020/122900.
International Written Opinion Dated Jul. 9, 2021 for International Application PCT/CN2020/122900.
Thales; "Solutions for NR to Support Non-Terrestrial Networks (NTN)"; 3GPP TSG RAN Meeting #86; RP-193234; Spain; Dec. 9-13, 2019.
Thales; "Solutions for NR to Support Non-Terrestrial Networks (NTN)"; 3GPP TSG RAN Meeting #88e; RP-201256; Jun. 29-Jul. 3, 2020.
'Solution for NR to Support Non-Terrestrial Networks (NTN); 3GPP TR 38.821; V16.2.0; Dec. 2019.
"3rd Generation Partnership Project; Technical Specification Group Radio Access Network; NR; Medium Access Control (MAC) Protocol Specification (Release 16)"; 3GPP TS 38.321; V16.1.0; Jul. 2020.
ZTE Corporation, Sanchips; "New Work Item: 2-Step RACH for NR"; 3GPP TSG RAN Meeting #82; RP-182894; Italy; Dec. 10-13, 2018.
"3rd Generation Partnership Project; Technical Specification Group Radio Access Network; NR; User Equipment (UE) Procedures in Idle Mode and RRC Inactive State (Release 16)"; 3GPP TS 38.304; V16.2.0; Sep. 2020.
"3rd Generation Partnership Project; Technical Specification Group Radio Access Network; NR; Requirements for Support of Radio Resource Management (Release 16)"; 3GPP TS 38.133; V16.5.0; Sep. 2020.
InterDigital, Summary of [AT111][107][NTN] Pre-compensation and other MAC issues Phase 2; 3GPP RAN WG2 Meeting #111e R2-2008214; Aug. 28, 2020.
CAICT, Consideration on idle mode issues in NTN; 3GPP TSG-RAN WG2 Meeting #112-e R2-2008814; Oct. 20, 2020.
ZTE Corporation, et al., Offline-106: [NTN] Idle mode issues; 3GPP TSG-RAN WG2 Meeting #111 R2-2008187; Aug. 28, 2020.

* cited by examiner

| | |
|---|---|
| Srxlev | Cell selection RX level value (dB) |
| Squal | Cell selection quality value (dB) |
| Qoffset$_{temp}$ | Offset temporarily applied to a cell as specified in TS 38.331 [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm). If the UE supports SUL frequency for this cell, Qrxlevmin is obtained from *q-RxLevMinSUL*, if present, in *SIB1*, *SIB2* and *SIB4*, additionally, if Q$_{rxlevminoffsetcellSUL}$ is present in *SIB3* and *SIB4* for the concerned cell, this cell specific offset is added to the corresponding Qrxlevmin to achieve the required minimum RX level in the concerned cell; else Qrxlevmin is obtained from *q-RxLevMin* in *SIB1*, *SIB2* and *SIB4*, additionally, if Q$_{rxlevminoffsetcell}$ is present in *SIB3* and *SIB4* for the concerned cell, this cell specific offset is added to the corresponding Qrxlevmin to achieve the required minimum RX level in the concerned cell. |
| Q$_{qualmin}$ | Minimum required quality level in the cell (dB). Additionally, if Q$_{qualminoffsetcell}$ is signalled for the concerned cell, this cell specific offset is added to achieve the required minimum quality level in the concerned cell. |
| Q$_{rxlevminoffset}$ | Offset to the signalled Q$_{rxlevmin}$ taken into account in the Srxlev evaluation as a result of a periodic search for a higher priority PLMN while camped normally in a VPLMN, as specified in TS 23.122 [9]. |
| Q$_{qualminoffset}$ | Offset to the signalled Q$_{qualmin}$ taken into account in the Squal evaluation as a result of a periodic search for a higher priority PLMN while camped normally in a VPLMN, as specified in TS 23.122 [9]. |
| P$_{compensation}$ | For FR1, if the UE supports the additionalPmax in the NR-NS-PmaxList, if present, in *SIB1*, *SIB2* and *SIB4*: $max(P_{EMAX1} - P_{PowerClass}, 0) - (min(P_{EMAX2}, P_{PowerClass}) - min(P_{EMAX1}, P_{PowerClass}))$ (dB); else: $max(P_{EMAX1} - P_{PowerClass}, 0)$ (dB)<br><br>For FR2, P$_{compensation}$ is set to 0. |
| P$_{EMAX1}$, P$_{EMAX2}$ | Maximum TX power level of a UE may use when transmitting on the uplink in the cell (dBm) defined as P$_{EMAX}$ in TS 38.101 [15]. If UE supports SUL frequency for this cell, P$_{EMAX1}$ and P$_{EMAX2}$ are obtained from the *p-Max* for SUL in *SIB1* and *NR-NS-PmaxList* for SUL respectively in *SIB1*, *SIB2* and *SIB4* as specified in TS 38.331 [3], else P$_{EMAX1}$ and P$_{EMAX2}$ are obtained from the *p-Max* and *NR-NS-PmaxList* respectively in *SIB1*, *SIB2* and *SIB4* for normal UL as specified in TS 38.331 [3]. |
| P$_{PowerClass}$ | Maximum RF output power of the UE (dBm) according to the UE power class as defined in TS 38.101-1 [15]. |

*FIG. 6*

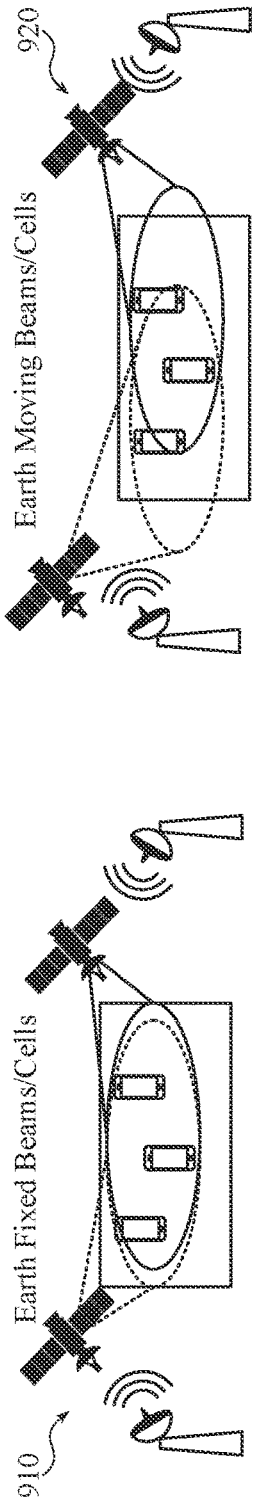
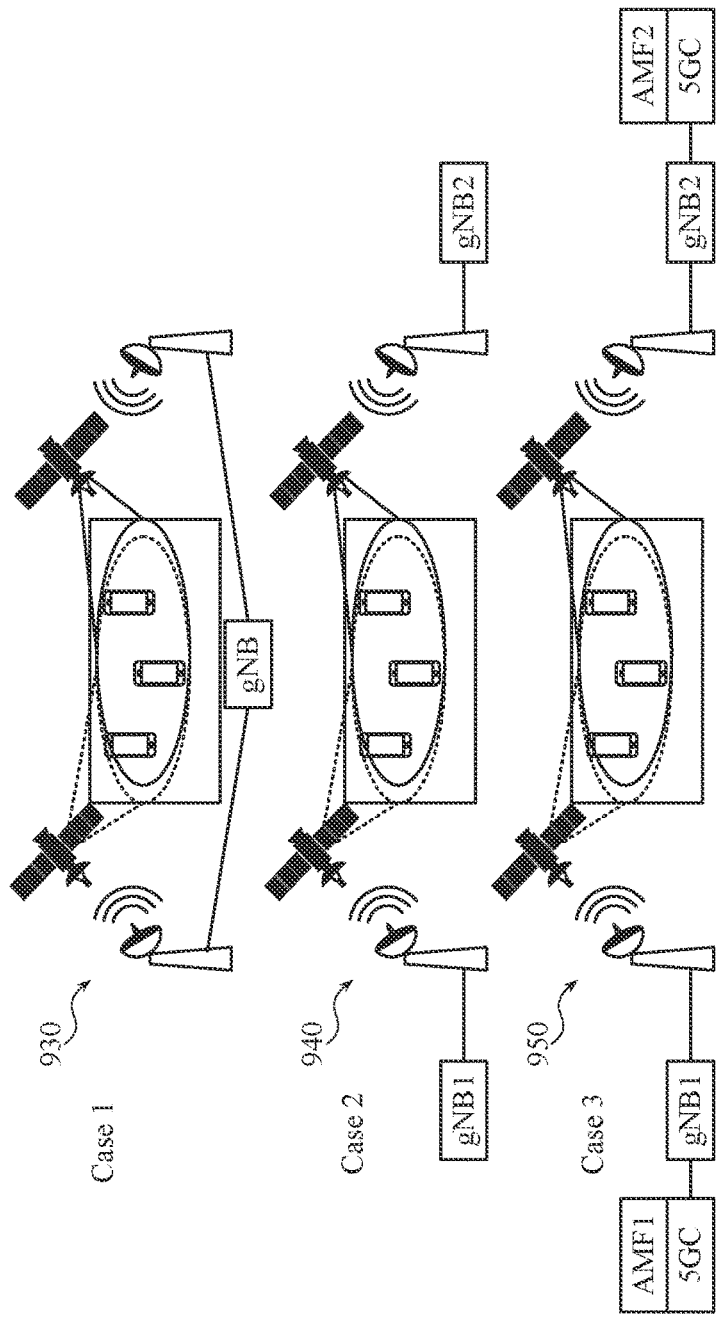
FIG. 9

US 12,096,289 B2

CELL SELECTION AND RESELECTION CRITERIA FOR NON-TERRESTRIAL NETWORK (NTN) NETWORKS

REFERENCE TO RELATED APPLICATIONS

This application is a National Phase entry application of International Patent Application No. PCT/CN2020/122900 filed Oct. 22, 2020, entitled "CELL SELECTION AND RESELECTION CRITERIA FOR NON-TERRESTRIAL NETWORK (NTN) AND NETWORKS", the contents of which are herein incorporated by reference in their entirety.

BACKGROUND

Mobile communication in the next generation wireless communication system, 5G, or new radio (NR) network can provide ubiquitous connectivity and access to information, as well as ability to share data, around the globe. 5G networks and network slicing can provide a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR can comprise both further developments based on third generation partnership project (3GPP) long term evolution (LTE)-Advanced technology and additional enhanced radio access technologies (RATs) to enable seamless and faster wireless connectivity solutions.

BRIEF DESCRIPTION OF THE DRAWINGS

FIG. 6 illustrates a table defining quantities involved in the cell selection criterion, in connection with various aspects discussed herein.

FIG. 9 illustrates diagrams of several example scenarios of beam coverage and network architecture for a pair of satellites, in connection with various aspects discussed herein.

DETAILED DESCRIPTION

Figure 1:
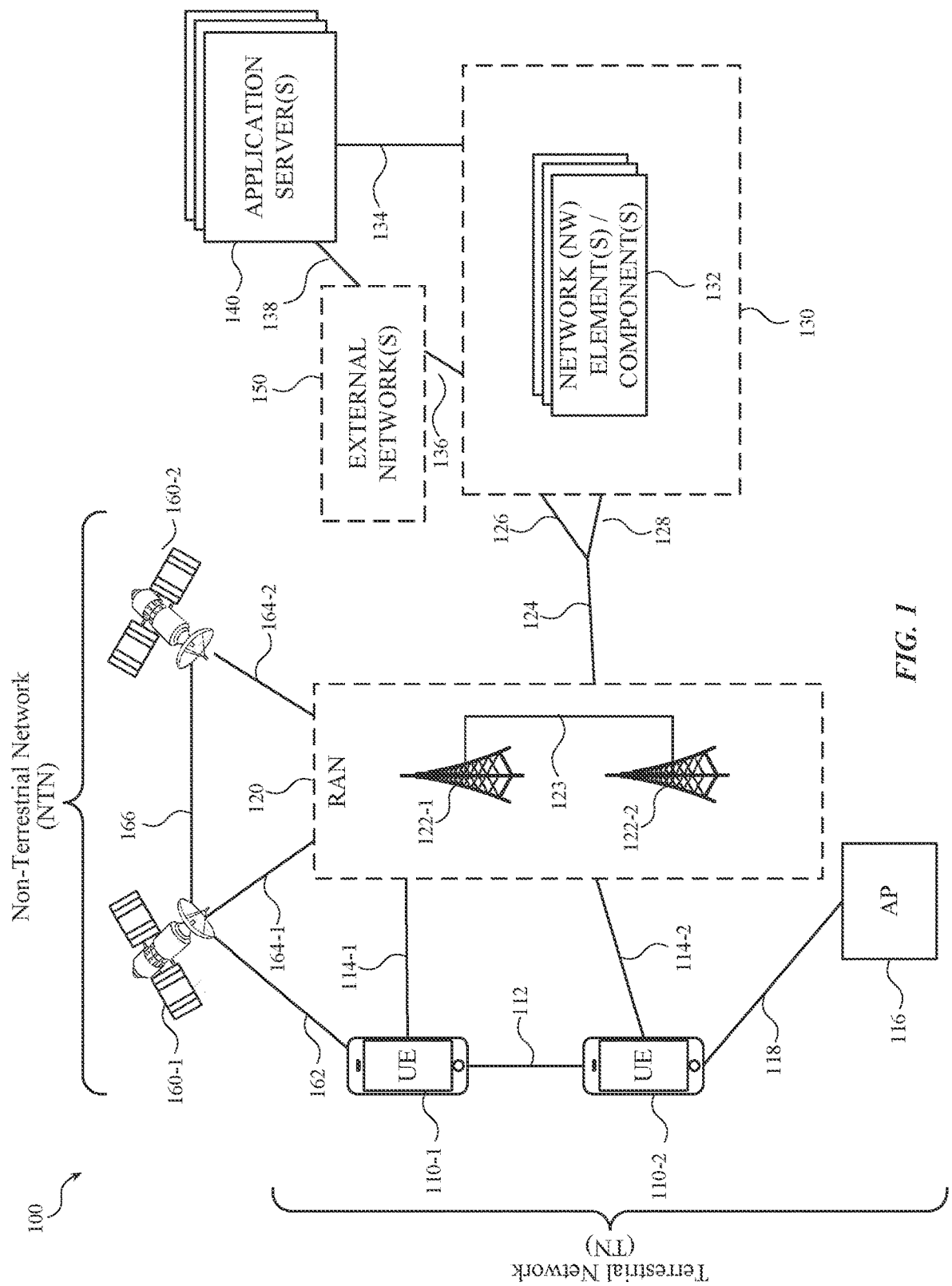
FIG. 1 is a block diagram illustrating an architecture of a system including a Core Network (CN), for example a Fifth Generation (5G) CN (5GC), in accordance with various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.). A "subset" of a set S is a "set" that can be either the set S or a "proper subset," wherein each element of the proper subset is an element of the set S, but the set S comprises at least one element that is not an element of the proper subset of set S.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects described herein can be implemented into a system using any suitably configured hardware and/or software. Referring to FIG. 1, illustrated is an example network 100, according to various aspects discussed herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3nd generation (3G), 4nd generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like.

As shown, UE 110 may also, or alternatively, connect to access point (AP) 116 via interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable the connections 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 120 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally or alternatively, one or more of RAN nodes 120 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to an secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers (as) 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application server 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2). Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
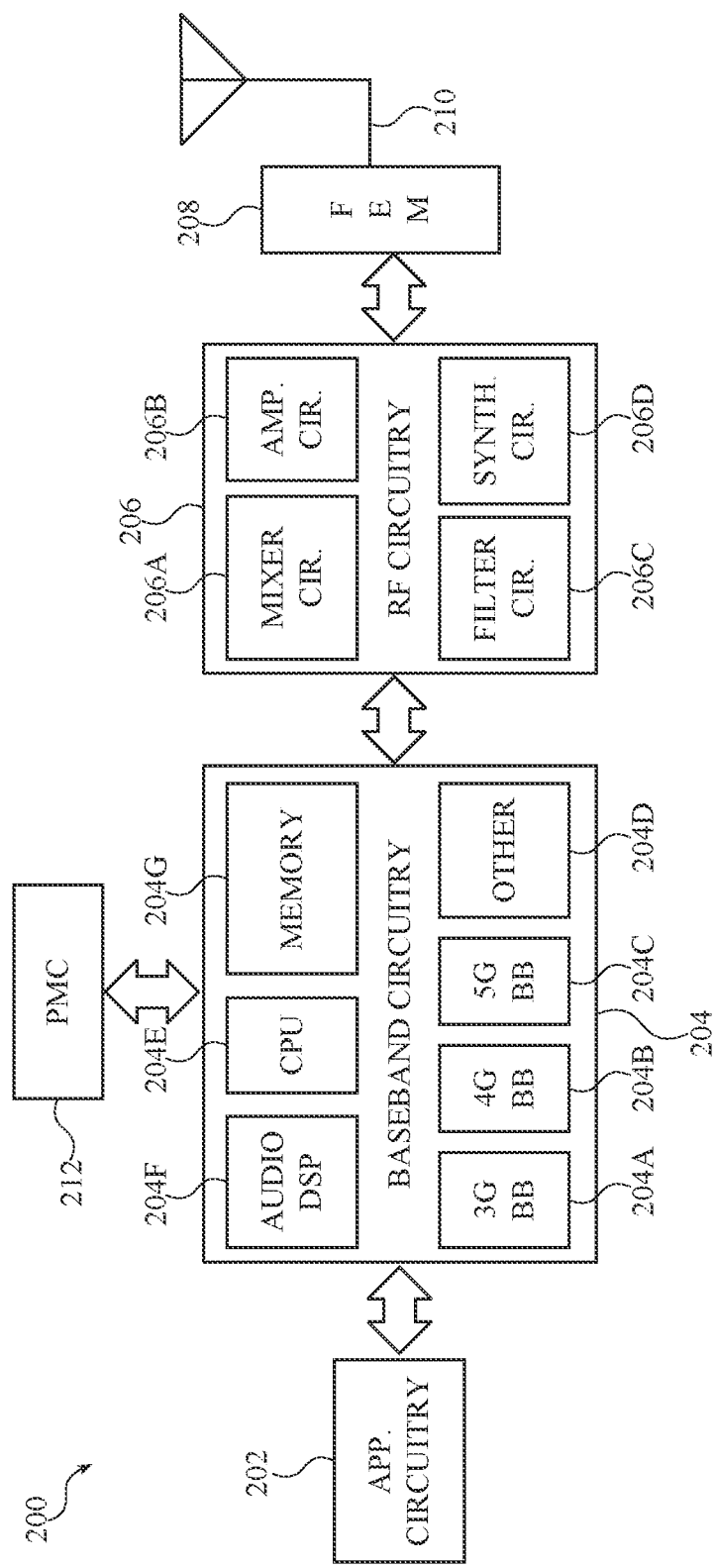
FIG. 2 is a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node may not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
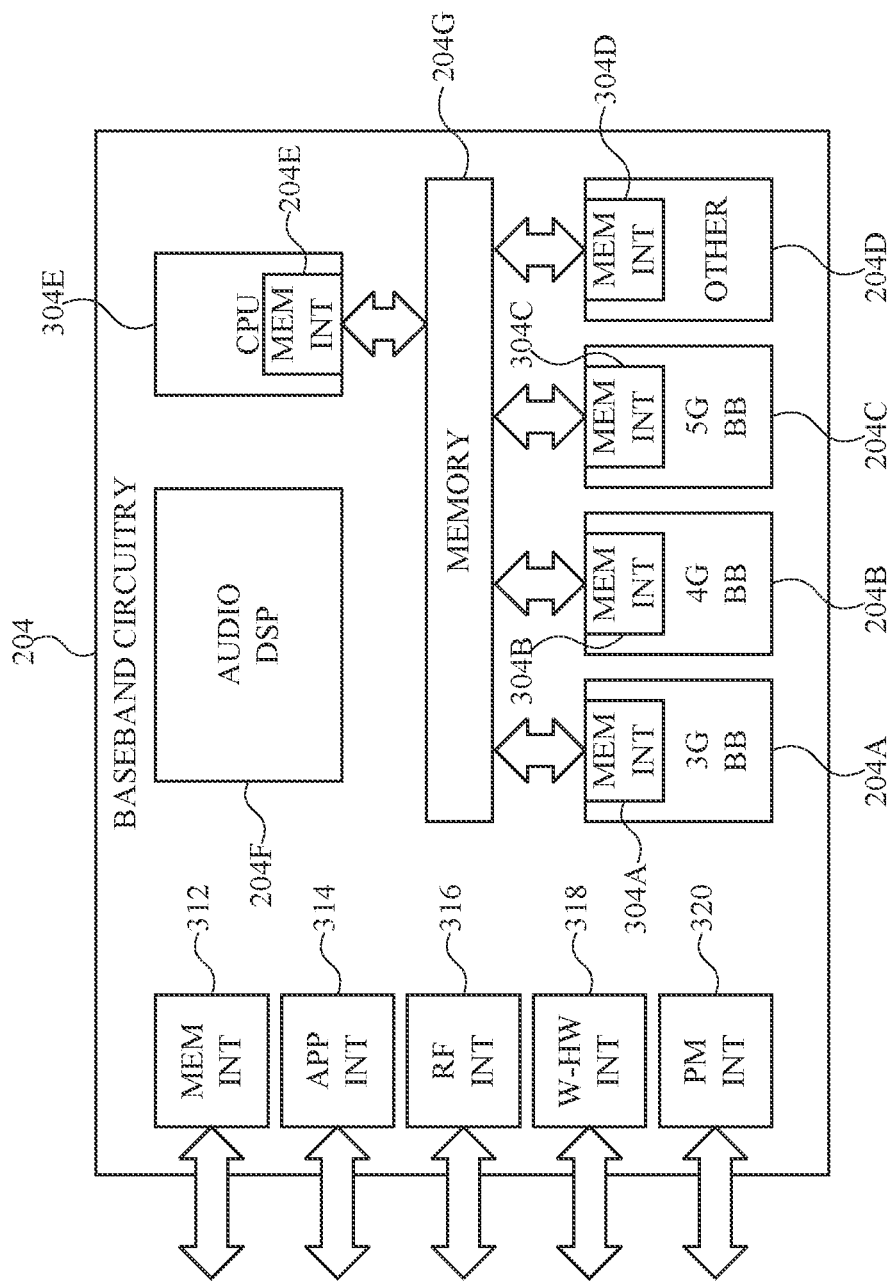
FIG. 3 is a diagram illustrating example interfaces of baseband circuitry that can be employed in accordance with various aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
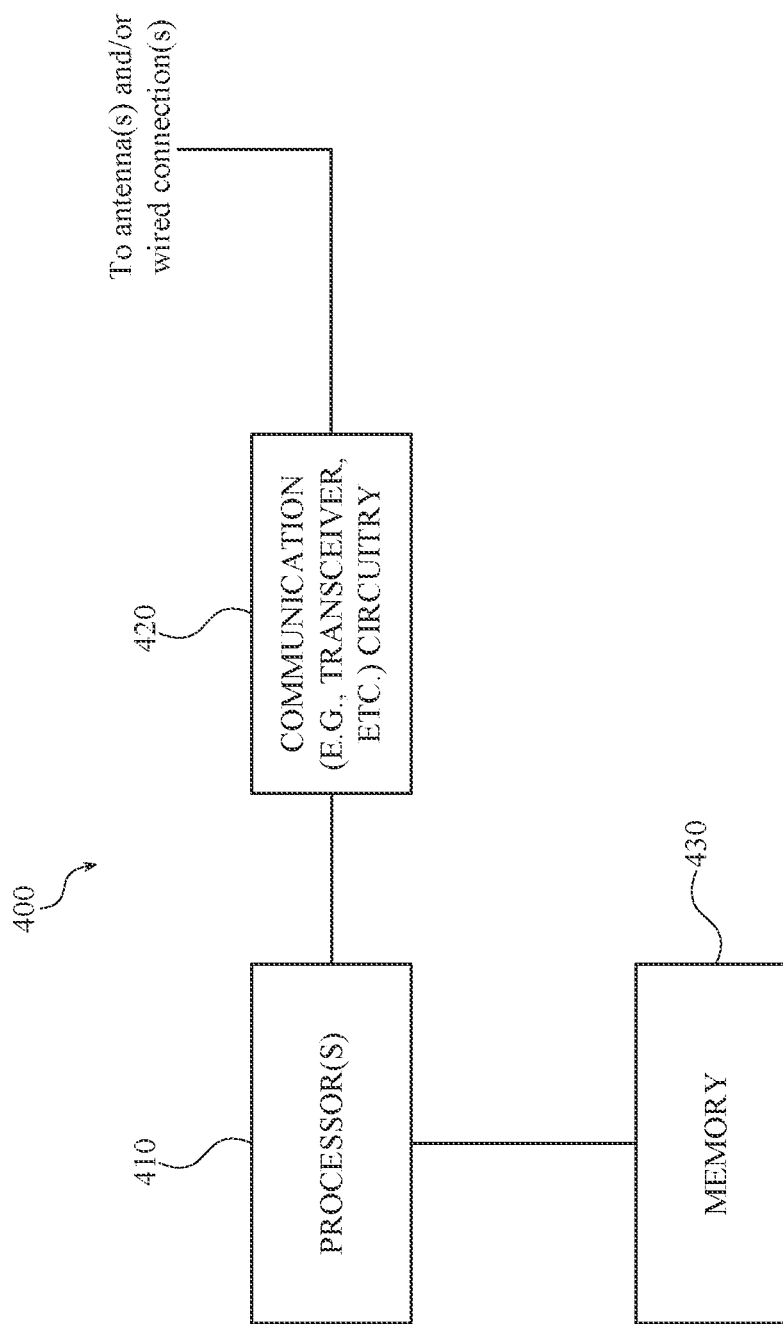
FIG. 4 is a block diagram illustrating a system that facilitates cell selection and/or reselection for a UE able to connect to one or more Non-Terrestrial Networks (NTNs), according to various aspects discussed herein.

Referring to FIG. 4, illustrated is a block diagram of a system 400 employable at a UE (User Equipment), a Base Station (BS, such as a next generation Node B (gNodeB or gNB), evolved Node B (eNB), or other BS (base station)/TRP (Transmit/Receive Point)), an Access and Mobility Management Function (AMF) or another component of a 3GPP (Third Generation Partnership Project) network (e.g., a 5GC (Fifth Generation Core Network)) component or function such as a AMF (Access and Mobility Management Function)) that facilitates cell selection and/or reselection for a UE able to connect to one or more Non-Terrestrial Networks (NTNs), according to various aspects discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of aspects of system 400 (e.g., UE aspects, etc.) can be indicated via subscripts (e.g., system $400_{UE}$ comprising processor(s) $410_{UE}$, communication circuitry $420_{UE}$, and memory $430_{UE}$). In some aspects, such as BS aspects (e.g., system $400_{BS}$) and network component (e.g., AMF, etc.) aspects (e.g., system $400_{AMF}$) processor(s) $410_{BS}$ (etc.), communication circuitry (e.g., $420_{BS}$, etc.), and memory (e.g., $430_{BS}$, etc.) can be in a single device or can be included in different devices, such as part of a distributed architecture. In aspects, signaling or messaging between different aspects of system 400 (e.g., $400_1$ and $400_2$) can be generated by processor(s) $410_1$, transmitted by communication circuitry $420_1$ over a suitable interface or reference point (e.g., a 3GPP air interface, N1, N8, N11, N22, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects, one or more of information (e.g., system information, resources associated with signaling, etc.), features, parameters, etc. can be configured to a UE via signaling (e.g., Access Stratum (AS) signaling, Non-Access Stratum (NAS)) originating from or routed through a Base Station (e.g., gNB, etc.) or other access point (e.g., via signaling generated by processor(s) $410_{BS}$, transmitted by communication circuitry $420_{BS}$, received by communication circuitry $420_{UE}$, and processed by processor(s) $410_{UE}$). Depending on the type of information, features, parameters, etc., the type of signaling employed and/or the exact details of the operations performed at the UE and/or BS in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Figure 5:
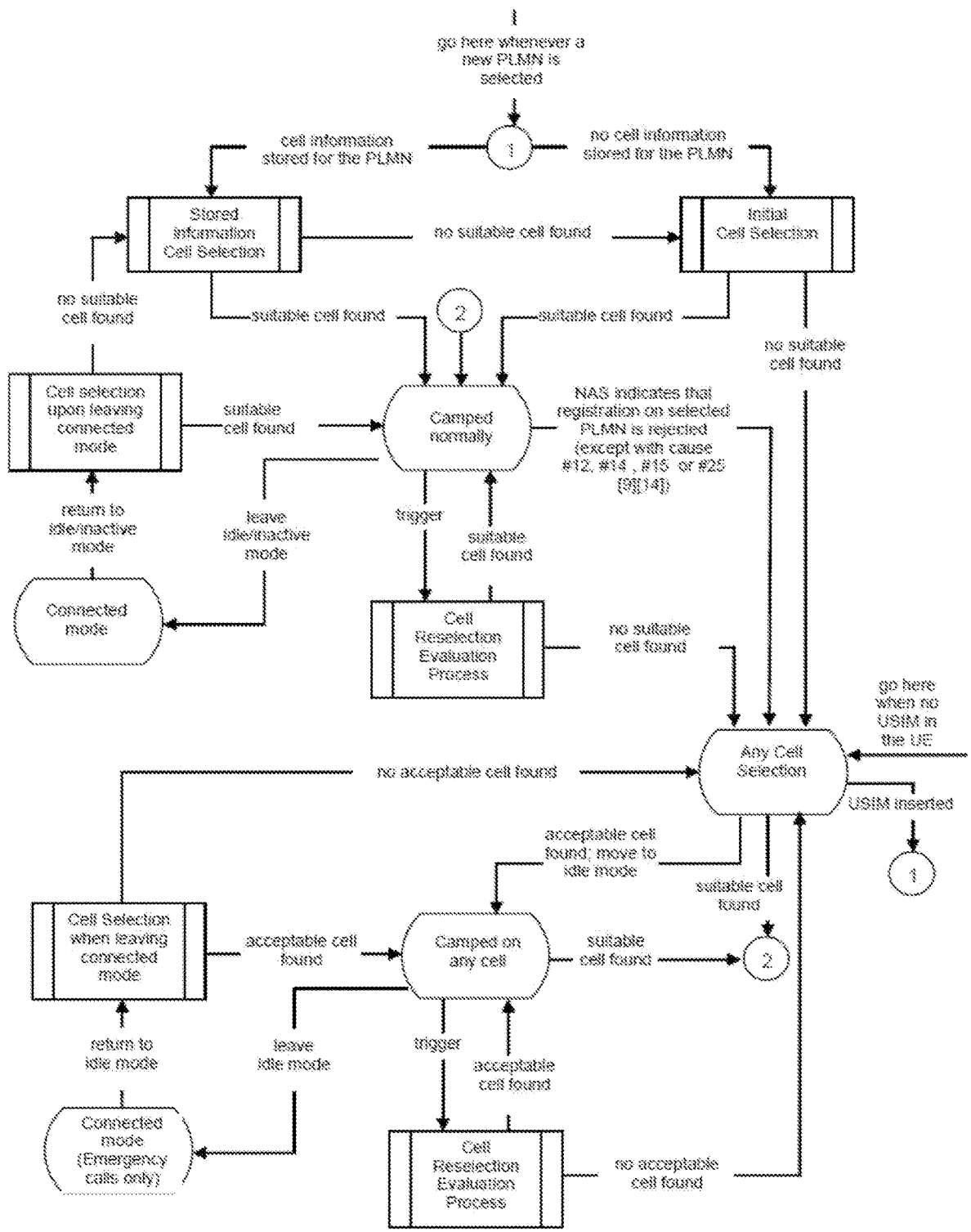
FIG. 5 is a chart illustrating Radio Resource Control (RRC) Idle mode (RRC_IDLE) or RRC Inactive mode (RRC_INACTIVE) cell selection and reselection, in connection with various aspects discussed herein.

Cell selection and reselection are discussed for Third Generation Partnership Project (3GPP) New Radio (NR) is discussed in 3GPP Technical Specification (TS) 38.304 and TS 38.133. Referring to FIG. 5, illustrated is a chart showing Radio Resource Control (RRC) Idle mode (RRC_IDLE) or RRC Inactive mode (RRC_INACTIVE) cell selection and reselection, in connection with various aspects discussed herein. In general, a cell can be selected via cell selection or reselection in Radio Resource Control (RRC) Idle mode (RRC_IDLE) or RRC Inactive mode (RRC_INACTIVE) if it (i) at least meets the cell selection criterion and is not barred (e.g., is an "acceptable cell") or (ii) is also part of a selected Public Land Mobile Network (PLMN), a registered PLMN, or a PLMN of an equivalent PLMN list (e.g., is a "suitable cell"). The cell selection criterion S is fulfilled when Srxlev>0 AND Squal>0, where Srxlev and Squal are as in equations (1):

$$Srxlv = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp} \quad (1)$$

where the quantities in equations (1) are defined as shown in the table of FIG. 6, defining quantities involved in the cell selection criterion, in connection with various aspects discussed herein.

Cell reselection can be based on priorities for (or a listing of without priority information) different NR frequencies or inter-Radio Access Technology (RAT) frequencies provided in system information, a RRCRelease message, dedicated signaling, or inherited from another RAT at inter-RAT cell selection or reselection. For cell reselection, a UE can determine a cell-ranking criterion Rs for the serving cell and Rn for neighboring cells as in equations (2):

$$R_s = Q_{meas,s} + Q_{hyst} - Qoffset_{temp}$$

$$R_n = Q_{meas,n} - Qoffset - Qoffset_{temp} \quad (1)$$

where the quantities in equations (2) are defined as follows: $Q_{meas}$ is the Reference Signal Received Power (RSRP) measurement quantity used in cell reselection (for serving or neighboring cell, depending on subscript), $Q_{hyst}$ specifies the hysteresis value for ranking criteria, $Qoffset_{temp}$ is an offset temporarily applied to a cell as specified in TS 38.331, for intra-frequency Qoffset is equal to $Qoffset_{s,n}$ (the offset between the two cells) if valid and zero otherwise, and for inter-frequency Qoffset is equal to $Qoffset_{s,n}$ plus $Qoffset_{frequency}$ (a frequency specific offset for equal priority NR frequencies) if valid and $Qoffset_{frequency}$ otherwise.

However, existing techniques for cell selection and reselection do not take into account various characteristics of Non-Terrestrial Networks (NTNs) that can affect cell selection/reselection.

Figure 7:
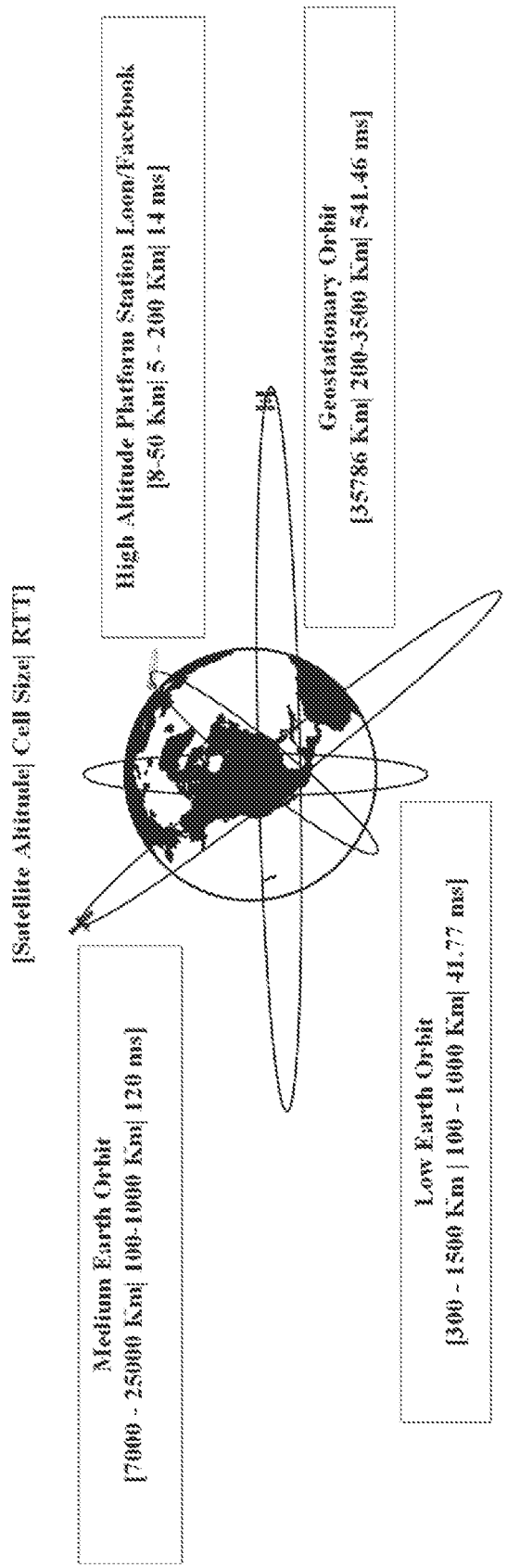
FIG. 7 illustrates a diagram showing different types of satellites that can be employed as nodes of Non-Terrestrial Network(s) (NTN(s)) along with relevant characteristics, in connection with various aspects discussed herein.

Referring to FIG. 7, illustrated is a diagram showing different types of satellites that can be employed as nodes of NTN networks along with relevant characteristics, in connection with various aspects discussed herein. The different types of satellites include (i) medium Earth orbit (MEO) satellites, with an altitude between 7000-25000 km, cell size between 100-1000 km, and round-trip time of approximately 120 ms; (ii) low Earth orbit (LEO) satellites, with an altitude between 300-1500 km, cell size between 100-1000 km, and round-trip time of approximately 41.77 ms; (ii) low Earth orbit (LEO) satellites, with an altitude between 300-1500 km, cell size between 100-1000 km, and round-trip time of approximately 41.77 ms; (iii) high altitude platform station (HAPS) satellites, with an altitude between 8-50 km, cell size between 5-200 km, and round-trip time of approximately 14 ms; and (iv) geostationary orbit (GEO) satellites, with an altitude of 35768 km, cell size between 200-3500 km, and round-trip time of approximately 541.46 ms.

Figure 8:
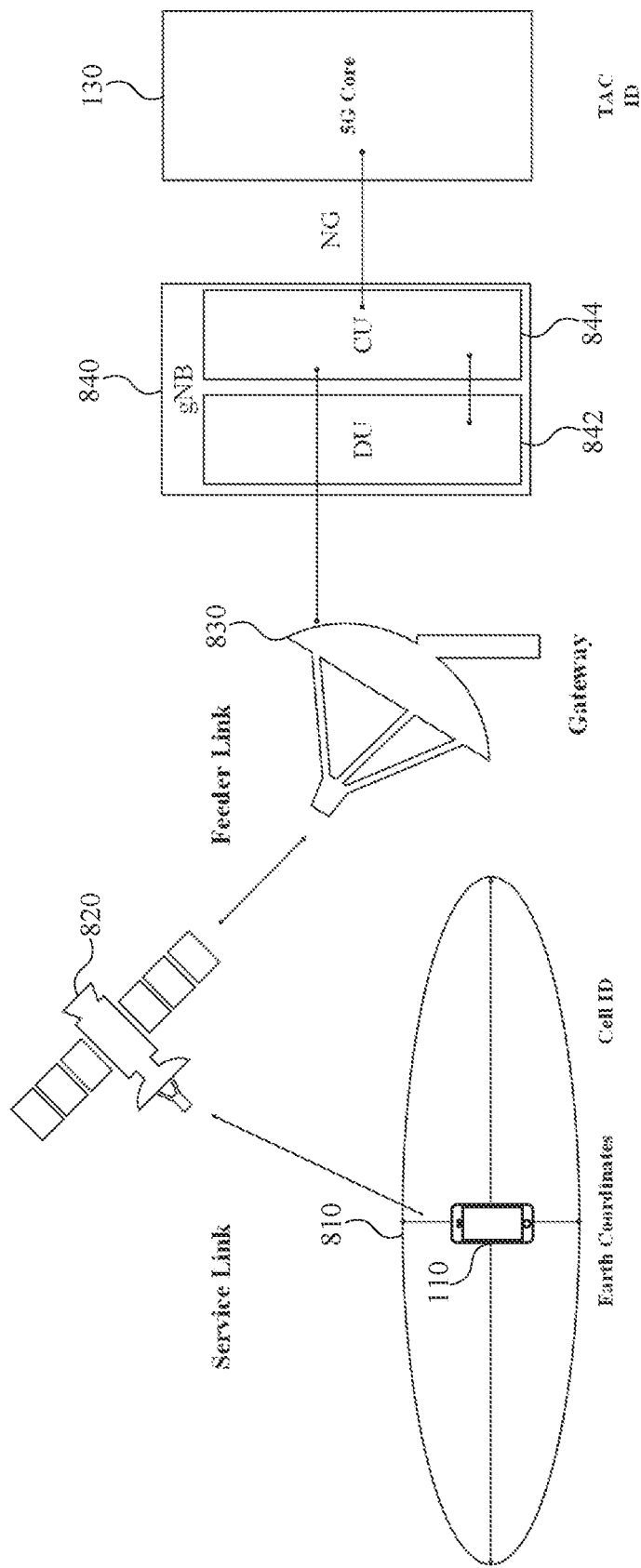
FIG. 8 illustrates a diagram of an example transparent mode architecture for a NTN network, in connection with various aspects discussed herein.

Various embodiments can employ a satellite that operates in a transparent mode, forwarding signaling between a UE and a gNB, while in other embodiments, part or all of a gNB can be located at the satellite. Referring to FIG. 8, illustrated is a diagram showing an example transparent mode architecture for a NTN network, in connection with various aspects discussed herein. In FIG. 8, a UE 110 can, based on its Earth coordinates, be located in a cell 810 served by a NTN, whereby UE 110 is connected to gNB 840 (comprising one or more Distributed Units (DU(s)) 842 and a Central Unit (CU) 844) and 5GC 130 via satellite 820 and gateway 830. The link between the UE 110 and satellite 820 is referred to as the service link, and the link between satellite 820 and the gateway 830 is referred to as the feeder link.

Multiple criteria can impact cell selection and/or reselection when at least one of the potential cells is a cell of a NTN network.

First, there are multiple architectures potentially possible for satellites, gateways, and associated network(s). These range from transparent to on-board architectures with a GEO, LEO or HAPS based satellite configuration. The configuration can also vary based on single or multiple beams used by the satellite nodes or based on whether the satellite has a single feeder link or multiple. Each of these beams can be steered through beam forming either to fixed locations on Earth (Earth Fixed Beams/Cells) or can be continuously moving relative to Earth latitude/longitudes (Earth Moving Beams/Cells). The potential possibilities for each of these configuration choices coupled with the large cell size of NTN cells and constant changes between short but consistent coverage and potential outage durations can impact cell selection and reselection in Non-Terrestrial Networks. Complications are also added when terrestrial nodes are also present in areas where NTN coverage are also present, with signal qualities unvarying and strong, albeit potentially brief. Referring to FIG. 9, illustrated is diagrams of several example scenarios of beam coverage and network architecture for a pair of satellites, in connection with various aspects discussed herein. In FIGS. 9, 910 and 920 show the Earth fixed and Earth moving beams/cells scenarios, respectively, while 930-950 show different cases indicating potential deployment possibilities on NTN. Scenario 930 shows a NTN Transparent Mode Architecture with a single gNB linked to multiple gateways. Scenario 940 shows a NTN Transparent Mode Architecture with independent gNBs connecting to different gateways. Scenario 950 shows a NTN Transparent Mode Architecture with a different 5GC for each satellite.

Other criteria can also impact cell selection/reselection involving NTN networks. For example, a satellite can cover an area using a single beam or multiple beams, depending on the deployment and/or cell load.

Additionally, because of the differences in operation, TN networks and NTN networks can potentially be regarded differently from a cell selection/reselection perspective. For example, when there is coverage on same and/or different frequencies as a NTN over a TN, it may be advantageous to consider frequency prioritization and/or TN/NTN based prioritization. Additionally, there is the issue of priorities between NTN only neighbors and TN neighbors, and whether a UE should prioritize NTN over TN, prioritize TN over NTN, or treat both with the same priority. Because of the large coverage areas of NTN cells, with satellite coverage extending over large areas (potentially hundreds or even thousands of kilometers), reprioritization rules and neighbor relations (e.g., involving NTN to NTN neighbors) can become complicated.

An additional consideration in some (e.g., non-GEO/HAPS) NTN networks is potentially short coverage durations and fixed outage durations. There is the potential for short coverage time due to the satellite movement relative to the Earth, and satellite outage times are fixed (and knowable at the UE) due to the availability of ephemeris data, whereby the UE can determine when the next satellite is coming into the coverage area.

Because of the differences between TN and NTN, various embodiments can provide additional assistance information for cell selection/reselection when at least one NTN cell is potentially available for cell selection/reselection.

As shown via the examples above, cell selection and reselection in NTN networks is impacted markedly by the deployment architecture and the high mobility of the satellite nodes.

Ephemeris data as indicated in 3GPP Technical Report (TR) 38.821 Annex A contains the orbital trajectories of satellite networks. The data provide information in terms of Earth relative location coordinates of the satellite position based on time of day, along with other useful information. The information in this database allows for deterministic knowledge of when a satellite will be in viewing range of a UE and when it will not be available. Propagating this information to the UE will be very beneficial to the UE in terms of cell selection procedures, and in various embodiments, this information can be provided to a UE via one of a variety of techniques (e.g., via NAS, AS signaling, etc.).

Thus, the availability of satellite ephemeris data at the UE is beneficial for cell selection/reselection on NTN Networks.

In various embodiments, RRC Idle/Inactive mode UEs can employ additional assistance information (e.g., using UE location information, satellite ephemeris information, additional parameter(s), etc.) for cell selection/reselection involving NTN networks than existing systems. Using an Earth-fixed tracking area can avoid frequent tracking area update (TAU). Various embodiments can provide NTN cell specific information to UEs via System Information Block(s) (SIB(s)) or via other techniques discussed herein.

NTN networks can impact UE and network behaviors and interactions in other ways beyond cell selection/reselection.

For example, in RRC connected mode operation, one or more schemes can be employed to address the following issues for NTN networks: (i) reducing service interruption during hand-over due to large propagation delay (e.g., especially for GEO transparent mode architectures, etc.); (ii) addressing frequent handover and high handover rate due to satellite movement (e.g., especially for LEO NTN(s), etc.); (iii) improving handover robustness due to small signal strength variations in regions of beam overlap; and (iv) compensating for propagation delay differences in the UE measurement window between cells originating from different satellites (e.g., especially for LEO NTN(s), etc.).

As another example, additional mobility enhancements may be appropriate to address NTN networks. Additional Conditional Handover (CHO) triggering conditions can be employed (e.g., location/time based, etc.), and measurement-based thresholds and events can be adapted to the NTN environment. Enhancements to mobility configuration can be potentially employed (e.g., to support broadcast configuration, etc.). Enhancements to measurement configuration/reporting can be employed (e.g., pre-triggering based solutions). Additionally, enhancements can be employed to ensure service continuity for mobility from TN to NTN and from NTN to TN systems.

For each of these scenarios (including cell selection/reselection, associated with embodiments discussed herein), the same solutions identified for Earth moving cell scenario(s) can also be applied for Earth fixed cell scenario(s), or different solutions can be applied for fixed/moving scenario(s).

Various aspects of NTN cell selection and reselection are discussed below. These aspects include the usage of additional available information from ephemeris that the network can broadcast to the UE for improved cell selection and reselection in NTN only scenarios, in connection with various embodiments. Additional aspects and embodiments address cell selection when TN nodes are in the range of NTN coverage, and potential solutions that can be adopted. Additional aspects discuss the case of cell selection and reselection that covers international boundaries.

Additional Parameters for Cell Selection and/or Reselection in NTN

Section 7.3.1.6 of TR 38.821 discusses the possibility of using ephemeris data and UE location information for cell selection and reselection. Using its location and ephemeris data, the UE can calculate with a certain degree of accuracy additional parameters such as satellite configuration (LEO, GEO etc.), the distance to the satellite, elevation angle or some additional parameter(s) that can aid in cell selection criteria. Considering the potential inaccuracies in determining these parameters and potential problems in transmitting the entire database to the UE in either a pre-loaded form (through uSIM) or through SIB (due to the overhead) based broadcasts, it would be beneficial if the network includes these additional parameters of satellite mobility and coverage information in some format to the UE in initial cell selection broadcast information. Additionally, UE location information calculations can lead to power constraints on the UE while generating privacy constraints if provided to the network. Even though location information cannot be excluded, it would be extremely useful for the network to provide ephemeris data and a relevant offset to the UE.

Accordingly, in various embodiments, the non-terrestrial network can provide additional measurement offset information (e.g., based on ephemeris, etc.) to UEs for improved cell selection and reselection.

A similar precedent that exists currently for such network-based offsets to UE for cell selection/reselection is with High Speed state parameter in System Information Blocks (SIBs). This would help solve the problems for not only stationary UEs in NTN networks but also for UEs which can be highly mobile (e.g., with speeds up to 500 Kmph as agreed in the 3GPP Radio Access Network (RAN) Working Group 2 (WG2) (RAN2) meeting #111-e Chairman's comments). As cells based on time of satellite change. For example, if there is very little dwell time available on the current satellite and the incoming satellite is close, an idle UE might be better off connecting to the incoming satellite, as opposed to the existing one.

Timing parameters such as common and/or differential delay or configuration (latency) based parameters can allow for a configuration based on the SIB-provided common delay, and also, in some embodiments, provide for the UE to select a link based on QoS targets or requirements.

UE can also be a useful parameter. For cases where mobility on the UE is involved (e.g., especially in cases such as enhanced Mobile Broad Band (eMBB) scenarios in an airplane or high-speed train with relative velocities of 100 Kmph or above), the UE speed relative to the satellite speed can be a relevant parameter.

In various embodiments, these additional parameter(s) can be provided to the UE for utilization in any of a variety of ways.

In a first option, Similar to how the HighSpeed parameters are currently treated in 3GPP TSs 38.133 and 38.304, any of the above additional parameters can be used as "a Scaling-Factor for $Q_{hyst}$," and be broadcasted in system information block type 2 (SIB2). As an example, a sample SIB2 Information Element (IE) for elevation angle can be as follows:

```
SIB2 ::=                            SEQUENCE {
    ElevationStateReselectionPars       SEQUENCE {
    ElevationStateParameters                ElevationStateParameters,
    q-HystSFElevation                       SEQUENCE {
        sf-ElevGEO                              ENUMERATED {dB-6, dB-4, dB-2, dB0},
        sf-ElevLEO                              ENUMERATED {dB-6, dB-4, dB-2, dB0},
        sf-ElevHAPS                             ENUMERATED {dB-6, dB-4, dB-2, dB0},
    }
    } Need R
}
``` an example, various embodiments can employ new SIB2 parameters for offsetting configurations such as GEO, LEO or HAPS in a similar format as HighSpeedStateParameters. For the case of cell reselection, these additional parameters can be added to the event-based A or B measurement configurations.

Accordingly, in various embodiments, new offsets discussed herein can be added to existing broadcast mechanisms and measurement configurations to enhance UE cell selection and reselection in non-terrestrial networks.

Alternate parameters that can be employed in various embodiments comprise one or more of a distance to a satellite, cell load, quality of service targets or requirements, an elevation angle, a time of feeder link change, a common delay, a differential delay, a UE speed, or a UE movement state.

Distance to a satellite or related information can aid cell selection/reselection. In various NTN configurations (e.g., where both GEO and LEO satellites exist, etc.), a distance or indication of the satellite configuration would help the UE choose the satellite with the least propagation delay. Networks can also prioritize the satellite configuration based on cell load, quality of service needed by the UE application or various other criteria for re-selecting between GEO, LEO, etc., or terrestrial nodes.

Elevation Angle is an alternate parameter that can be used to identify the most suitable network configuration, similar to distance.

Feeder link change (e.g., ephemeris based), if indicated sufficiently ahead of time, can allow for better selection of The $Q_{hyst}$ ranges in the example are one possible example, and can vary. Similar IEs for other parameters can be created with varying ranges of QHyst.

In a first alternative of the first option, the indicated parameter(s) can be sent in a dedicated IE for satellite networks. In a second alternative of the first option, the indicated parameter(s) can be sent through RRC-based signaling for offline storage over terrestrial nodes so that they can be applied for specified configurations. However, this alternative limits the ability of the UE to directly access the NTN network until this information is obtained via terrestrial nodes.

In a second option, for selection based on one or more parameters (e.g., such as elevation angle and delay, etc.), an "or" condition optionally can be added to the S-Criterion (instead of Srxlev>0 AND Squal>0), depending on how the frequency/network/PLMN is prioritized.

In a third option, a non-access stratum (NAS)-based solution can be employed, for example, by preloading a database, etc. comprising initial parameters for one or more NTN networks, which, in various embodiments, can be updated later as appropriate.

Scenarios where these parameter adjustments can be advantageous is where multiple NTN configurations might overlap with one another. One such example scenario is where a GEO configuration might overlap with a LEO configuration of the same operator.

As suggested by the above example scenarios, 3GPP NTN does not preclude deployment scenarios where multiple NTN configurations might be overlapping over one another.

In such situations, currently there is no way for the network to indicate which of the two configurations are to be prioritized to the UEs unless using frequency. But using frequency prioritization might not always yield the best scenario in this case, because of the transient nature of LEO. In such situations, a prioritization integer between different NTN configurations would be highly beneficial to UEs both from a measurement perspective and performance perspective. Accordingly, in various embodiments, a prioritization field can be signaled to the UE to indicate a priority associated with or between NTN configuration(s). The prioritization field becomes even more useful when there are terrestrial neighbors to these NTN cells as explained in greater detail below.

Accordingly, in various embodiments, for NTN(s), an intra-NTN prioritization flag can be employed aid in UE cell selection and cell reselection.

Cell Selection/Reselection of NTN UEs with TN Neighbors

Cell selection/reselection involving NTN cells becomes more complicated when NTN cells have TN neighbors. Consider the scenario where a large GEO cell is overlapped over multiple TN cells. The stability in terms of RF for such large NTN cells might cause the UE to always prioritize to camp on to the GEO cell before a terrestrial cell. 3GPP RAN2 #111-e agreed that separation of frequencies in terms of TN or NTN will be broadcasted. However, it was left for further study on how this broadcast will happen. This can address the problem if the assumption is that TN and NTN will operate independently and is suitable for only one of the cases of either TN being prioritized over NTN or NTN being prioritized over TN but not both.

However, the RAN2 agreed broadcast mechanism on whether a cell is TN or NTN will not help with prioritization of one over the other specifically for cell selection. In such situations, various embodiments can provide an explicit indication to the UE if there is any network preference in terms of TN or NTN cells. For efficient cell selection, prioritization between terrestrial cells and non-terrestrial cells in mixed coverage locations can be performed using broadcast messages via any of a variety of mechanisms.

Compared to TN networks, NTN networks have a large coverage area (e.g., potentially can cover an entire country in case of GEO, etc.). Though throughputs are low NTN networks can potentially be available everywhere in terms of coverage. Additionally, NTN networks have large areas of uniform coverage, unlike terrestrial networks with near, mid and far scenarios. However, NTN network may be unreliable, especially indoors or in other areas without line of sight. Ephemeris data can provide a definite location of a satellite.

Many NTN networks are also mobile, which makes them unreliable in terms of eMBB and various quality of service scenarios. However, the mobility pattern itself is deterministic based on ephemeris. A mobile UE can make this scenario even more problematic, with dynamic TN and NTN cells.

Cell selection involving both TN and NTN cells involves the issues of whether and how the network can prioritize TN over NTN, NTN over TN, or leave it up to UE implementation based on both being in the same RAT.

Various embodiments can employ a prioritization flag and/or camping order that can help a UE choose the best network and avoid ping pongs (frequent reselection) between TN and NTN networks.

In one option, a new prioritization field can be introduced in SIB1, which can be enumerated using an integer to indicate the priority of that particular cell relative to other cells. In some embodiments, this prioritization field can be added as a sub-array of the plmn-IdentityList field.

In a first set of alternative embodiments, a NAS message can be provided to indicate the priority list, which is then passed to the AS.

A second set of alternative embodiments can repurpose the intraFreqReselection field in the Master Information Block (MIB) that controls cell selection/reselection to intrafrequency cells when the highest ranked cell is barred, or treated as barred by the UE, as specified in TS 38.304 to indicate if a cell is barred or not.

A third set of alternative embodiments can repurpose the intrafreqyyy and interfreqzzz messages in SIB3 and SIB4 to determine priorities between NTN and TN cells.

In the cases of mixed coverage areas, one issue that can be seen by UEs is that the large coverage areas of NTN will lead to tens and even hundreds of potential terrestrial neighbor cells. TR 38.821 proposes to use UE location information to identify the zone the UE is present in and use reselection based on the location identification. However, this is power consuming, since the UE needs to continuously monitor its location in order to identify if it is in or out of a particular fixed or mobile beam. Thus, location based reselections lead to power drain on the UE in regular cell selection and reselection scenarios. Accordingly, in various embodiments, a beam-based neighbor cell list can be provided for NTN UEs, so as to avoid the penalty of location measurement related power drain.

ADDITIONAL EXAMPLES

Figure 10:
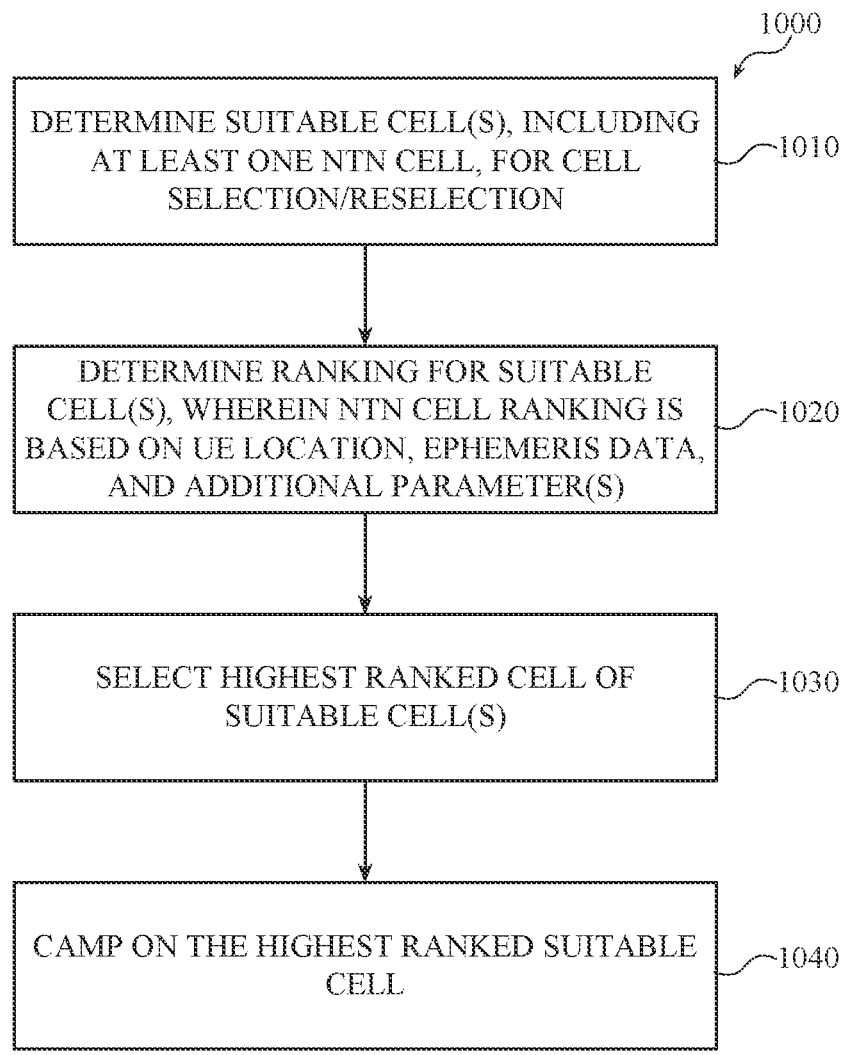
FIG. 10 illustrates a flow diagram of an example method that facilitates cell selection and/or reselection in scenarios involving at least one NTN cell, according to various embodiments discussed herein.

Referring to FIG. 10, illustrated is a flow diagram of an example method 1000 employable at a UE that facilitates cell selection and/or reselection in scenarios involving at least one NTN cell, according to various embodiments discussed herein. In other aspects, a machine readable medium can store instructions associated with method 1000 that, when executed, can cause a UE (e.g., employing system $400_{UE}$) to perform the acts of method 1000.

At 1010, one or more suitable cells (or if no suitable cells are available, one or more acceptable cells) can be determined (e.g., via the S criterion discussed herein, etc.) for one of a cell selection procedure or a cell re-selection procedure, wherein the one or more suitable cells comprise at least one cell associated with a satellite of a non-terrestrial network (NTN).

At 1020, a ranking can be determined for each cell of the one or more suitable cells, wherein the ranking for the first cell can be based at least in part on a location of the UE, ephemeris data of the satellite, and one or more additional parameters (e.g., a distance to a satellite, cell load, quality of service targets or requirements, an elevation angle, a time of feeder link change, a common delay, a differential delay, a UE speed, a UE movement state, etc.).

At 1030, a highest ranked cell of the one or more suitable cells can be selected based on the determined rankings for each cell of the one or more suitable cells.

At 1040, the UE can camp on the highest ranked cell (e.g., where camping on a cell can have the meaning in 3GPP TS 38.304, etc., that the UE has completed the cell selection/reselection process and has chosen a cell, and that the UE monitors system information and (in most cases) paging information).

Additionally or alternatively, method 1000 can include one or more other acts described herein in connection with various embodiments of a UE and/or system $400_{UE}$.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a User Equipment (UE) device comprising a processor configured to perform operations comprising: determining one or more suitable cells for one of a cell selection procedure or a cell re-selection procedure, wherein the one or more suitable cells comprise a first cell associated with a satellite of a non-terrestrial network (NTN); determining a ranking for each cell of the one or more suitable cells, wherein the ranking for the first cell is based at least in part on a location of the UE, ephemeris data of the satellite, and one or more additional parameters; selecting a highest ranked cell of the one or more suitable cells based on the determined rankings for each cell of the one or more suitable cells; and camping on the highest ranked cell.

Example 2 comprises the subject matter of any variation of any of example(s) 1, wherein the one or more additional parameters comprise at least one of: a distance to the satellite, an elevation angle of the satellite, a common delay associated with the first cell, a differential delay associated with the first cell and the UE, a speed of the UE, or a mobility state of the UE.

Example 3 comprises the subject matter of any variation of any of example(s) 1-2, wherein the operations further comprise scaling a Qhyst parameter for the first cell based on the one or more additional parameters, wherein the Qhyst parameter for the first cell specifies a hysteresis value for the ranking for the first cell.

Example 4 comprises the subject matter of any variation of any of example(s) 1-3, wherein the one or more additional parameters are signaled via one of a System Information Block Type 2 (SIB2) Information Element (IE), a dedicated IE for NTN networks, or Radio Resource Control (RRC) signaling via a terrestrial node.

Example 5 comprises the subject matter of any variation of any of example(s) 1-4, wherein the operations further comprise determining that the first cell is a suitable cell based on at least one of (i) a cell selection received level value for the first cell being greater than zero or (ii) a cell selection quality level for the first cell being greater than zero.

Example 6 comprises the subject matter of any variation of any of example(s) 1-5, wherein the operations further comprise determining the one or more additional parameters based on information provided via Non-Access Stratum (NAS) signaling.

Example 7 comprises the subject matter of any variation of any of example(s) 1-6, wherein the one or more suitable cells further comprise at least one terrestrial network (TN) cell, and wherein the one or more additional parameters indicate a priority of the first cell relative to the at least one TN cell, wherein the ranking for the first cell is based at least in part on the priority of the first cell relative to the at least one TN cell.

Example 8 comprises the subject matter of any variation of any of example(s) 7, wherein the priority is indicated via at least one of a Master Information Block (MIB), a System Information Block Type 1 (SIB1), a SIB3, or a SIB4.

Example 9 comprises the subject matter of any variation of any of example(s) 7, wherein the priority is indicated via a Non-Access Stratum (NAS) message passed to the Access Stratum (AS).

Example 11 is a method, comprising: determining one or more suitable cells for one of a cell selection procedure or a cell re-selection procedure, wherein the one or more suitable cells comprise a first cell associated with a satellite of a non-terrestrial network (NTN); determining a ranking for each cell of the one or more suitable cells, wherein the ranking for the first cell is based at least in part on a location of the UE, ephemeris data of the satellite, and one or more additional parameters; selecting a highest ranked cell of the one or more suitable cells based on the determined rankings for each cell of the one or more suitable cells; and camping on the highest ranked cell.

Example 12 comprises the subject matter of any variation of any of example(s) 11, wherein the one or more additional parameters comprise at least one of: a distance to the satellite, an elevation angle of the satellite, a common delay associated with the first cell, a differential delay associated with the first cell and the UE, a speed of the UE, or a mobility state of the UE.

Example 13 comprises the subject matter of any variation of any of example(s) 11-12, further comprising scaling a Qhyst parameter for the first cell based on the one or more additional parameters, wherein the Qhyst parameter for the first cell specifies a hysteresis value for the ranking for the first cell.

Example 14 comprises the subject matter of any variation of any of example(s) 11-13, wherein the one or more additional parameters are signaled via one of a System Information Block Type 2 (SIB2) Information Element (IE), a dedicated IE for NTN networks, or Radio Resource Control (RRC) signaling via a terrestrial node.

Example 15 comprises the subject matter of any variation of any of example(s) 11-14, further comprising determining that the first cell is a suitable cell based on at least one of (i) a cell selection received level value for the first cell being greater than zero or (ii) a cell selection quality level for the first cell being greater than zero.

Example 16 comprises the subject matter of any variation of any of example(s) 11-15, further comprising determining the one or more additional parameters based on information provided via Non-Access Stratum (NAS) signaling.

Example 17 comprises the subject matter of any variation of any of example(s) 11-16, wherein the one or more suitable cells further comprise at least one terrestrial network (TN) cell, and wherein the one or more additional parameters indicate a priority of the first cell relative to the at least one TN cell, wherein the ranking for the first cell is based at least in part on the priority of the first cell relative to the at least one TN cell.

Example 18 comprises the subject matter of any variation of any of example(s) 17, wherein the priority is indicated via at least one of a Master Information Block (MIB), a System Information Block Type 1 (SIB1), a SIB3, or a SIB4.

Example 19 comprises the subject matter of any variation of any of example(s) 17, wherein the priority is indicated via a Non-Access Stratum (NAS) message passed to the Access Stratum (AS).

Example 21 is a baseband processor comprising processing circuitry configured to perform operations comprising: determining one or more suitable cells for one of a cell selection procedure or a cell re-selection procedure, wherein the one or more suitable cells comprise a first cell associated with a satellite of a non-terrestrial network (NTN); determining a ranking for each cell of the one or more suitable cells, wherein the ranking for the first cell is based at least in part on a location of the UE, ephemeris data of the satellite, and one or more additional parameters; selecting a highest ranked cell of the one or more suitable cells based on the determined rankings for each cell of the one or more suitable cells; and camping on the highest ranked cell.

Example 22 comprises the subject matter of any variation of any of example(s) 21, wherein the one or more additional parameters comprise at least one of: a distance to the satellite, an elevation angle of the satellite, a common delay associated with the first cell, a differential delay associated with the first cell and the UE, a speed of the UE, or a mobility state of the UE.

Example 23 comprises the subject matter of any variation of any of example(s) 21-22, wherein the operations further comprise scaling a $Q_{hyst}$ parameter for the first cell based on the one or more additional parameters, wherein the $Q_{hyst}$ parameter for the first cell specifies a hysteresis value for the ranking for the first cell.

Example 24 comprises the subject matter of any variation of any of example(s) 21-23, wherein the one or more additional parameters are signaled via one of a System Information Block Type 2 (SIB2) Information Element (IE), a dedicated IE for NTN networks, or Radio Resource Control (RRC) signaling via a terrestrial node.

Example 25 comprises the subject matter of any variation of any of example(s) 21-24, wherein the operations further comprise determining that the first cell is a suitable cell based on at least one of (i) a cell selection received level value for the first cell being greater than zero or (ii) a cell selection quality level for the first cell being greater than zero.

Example 26 comprises the subject matter of any variation of any of example(s) 21-25, wherein the operations further comprise determining the one or more additional parameters based on information provided via Non-Access Stratum (NAS) signaling.

Example 27 comprises the subject matter of any variation of any of example(s) 21-26, wherein the one or more suitable cells further comprise at least one terrestrial network (TN) cell, and wherein the one or more additional parameters indicate a priority of the first cell relative to the at least one TN cell, wherein the ranking for the first cell is based at least in part on the priority of the first cell relative to the at least one TN cell.

Example 28 comprises the subject matter of any variation of any of example(s) 27, wherein the priority is indicated via at least one of a Master Information Block (MIB), a System Information Block Type 1 (SIB1), a SIB3, or a SIB4.

Example 29 comprises the subject matter of any variation of any of example(s) 27, wherein the priority is indicated via a Non-Access Stratum (NAS) message passed to the Access Stratum (AS).

Example 31 comprises an apparatus comprising means for executing any of the described operations of examples 1-30.

Example 32 comprises a machine readable medium that stores instructions for execution by a processor to perform any of the described operations of examples 1-30.

Example 33 comprises a baseband processor comprising: a memory interface; and processing circuitry configured to: perform any of the described operations of examples 1-30.

Example 34 comprises a User Equipment (UE) configured to execute any of the described operations of examples 1-30.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A User Equipment (UE) comprising a memory and a baseband processor configured to, when executing instructions stored in the memory, perform operations comprising:
   receiving a broadcast signal indicating ephemeris data of a satellite of a non-terrestrial network (NTN);
   determining one or more suitable cells for one of a cell selection procedure or a cell re-selection procedure, wherein the one or more suitable cells comprise a first cell associated with the satellite of the non-terrestrial network (NTN);
   determining a ranking for each cell of the one or more suitable cells, wherein the ranking for the first cell is based at least in part on a location of the UE, the ephemeris data, and one or more additional parameters;
   selecting a highest ranked cell of the one or more suitable cells based on the determined ranking for each cell of the one or more suitable cells; and
   camping on the highest ranked cell.

2. The UE of claim 1, wherein the ephemeris data indicates a time at which a feeder link change will occur and the operations further comprise determining the ranking based on the time of the feeder link change.

3. The UE of claim 1, wherein the operations further comprise
   receiving Non-Access Stratum (NAS) signaling of a database comprising initial parameters for the NTN; and
   determining the ranking based on the initial parameters for the NTN.

4. The UE of claim 1, wherein the one or more suitable cells further comprise at least one terrestrial network (TN) cell, and wherein the one or more additional parameters indicate a priority of the first cell relative to the at least one TN cell, wherein the ranking for the first cell is based at least in part on the priority of the first cell relative to the at least one TN cell.

5. The UE of claim 4, wherein the priority is indicated via at least one of a Master Information Block (MIB), a System Information Block Type 1 (SIB1), a SIB3, or a SIB4.

6. The UE of claim 4, wherein the priority is indicated via a Non-Access Stratum (NAS) message passed to an Access Stratum (AS).

7. The UE of claim 1 wherein the one or more suitable cells further comprise at least one terrestrial network (TN) cell, and wherein the ranking for the first cell is based at least in part on stored priority information for NTN cells relative to TN cells.

8. A method, comprising:
   determining one or more suitable cells for one of a cell selection procedure or a cell re-selection procedure, wherein the one or more suitable cells comprise a first cell associated with a satellite of a non-terrestrial network (NTN);
   receiving signaling indicating at least one scaling factor associated with a distance to the satellite, an elevation angle of the satellite, a common delay associated with the first cell, a differential delay associated with the first cell and a user equipment (UE), a speed of the UE, or a mobility state of the UE;
   determining a ranking for each cell of the one or more suitable cells, wherein the ranking for the first cell is based at least in part on the at least one scaling factor, a location of a UE, ephemeris data of the satellite, and one or more additional parameters;
   selecting a highest ranked cell of the one or more suitable cells based on the determined ranking for each cell of the one or more suitable cells; and
   camping on the highest ranked cell.

9. The method of claim 8, wherein the scaling factor is associated with a hysteresis parameter that specifies a hysteresis value for the ranking for the first cell.

10. The method of claim 8, wherein the signaling comprises one of a System Information Block Type 2 (SIB2) Information Element (IE), a dedicated IE for NTN, or Radio Resource Control (RRC) signaling via a terrestrial node.

11. The method of claim 8, further comprising determining that the first cell is a suitable cell based on at least one of (i) a cell selection received level value for the first cell being greater than zero or (ii) a cell selection quality level for the first cell being greater than zero.

12. The method of claim 8, wherein the one or more suitable cells further comprise at least one terrestrial network (TN) cell, and wherein the ranking for the first cell is based at least in part on stored priority information for NTN cells relative to TN cells.

13. A baseband processor configured to perform operations comprising:
   determining one or more suitable cells for one of a cell selection procedure or a cell re-selection procedure, wherein the one or more suitable cells comprise a first cell associated with a satellite of a non-terrestrial network (NTN);
   determining a ranking for each cell of the one or more suitable cells, wherein the ranking for the first cell is based at least in part on a location of a UE, ephemeris data of the satellite, a configuration of the NTN, and one or more additional parameters;
   selecting a highest ranked cell of the one or more suitable cells based on the determined ranking for each cell of the one or more suitable cells; and
   controlling operation of a transceiver to camp on the highest ranked cell.

14. The baseband processor of claim 13, wherein the one or more additional parameters comprise at least one of: a distance to the satellite, an elevation angle of the satellite, a common delay associated with the first cell, a differential delay associated with the first cell and the UE, a speed of the UE, or a mobility state of the UE.

15. The baseband processor of claim 13, wherein the configuration of the NTN characterizes the satellite as one of medium earth orbit (MEO), low earth orbit (LEO), high altitude platform station (HAPS), or geostationary orbit (GEO).

16. The baseband processor of claim 13, wherein the operations further comprise determining the one or more additional parameters based on information provided via Non-Access Stratum (NAS) signaling.

17. The baseband processor of claim 13, wherein the operations comprise
   receiving signaling of an intra-NTN prioritization that prioritizes different NTN configurations; and
   determining the ranking based on the intra-NTN prioritization.

18. The baseband processor of claim 17, wherein the intra-NTN prioritization is indicated via at least one of a Master Information Block (MIB), a System Information Block Type 1 (SIB1), a SIB3, or a SIB4.

19. The baseband processor of claim 17, wherein the intra-NTN prioritization is indicated via a Non-Access Stratum (NAS) message passed to an Access Stratum (AS).

20. The baseband processor of claim 13, wherein the one or more suitable cells further comprise at least one terrestrial network (TN) cell, and wherein the ranking for the first cell is based at least in part on stored priority information for NTN cells relative to TN cells.

* * * * *